United States Patent [19]
Kawase

[11] Patent Number: 5,202,806
[45] Date of Patent: Apr. 13, 1993

[54] MAGNETIC HEAD

[75] Inventor: Masahiro Kawase, Higashimatsuyama, Japan

[73] Assignee: Canon Denshi Kabushiki Kaisha, Chichibu, Japan

[21] Appl. No.: 686,402

[22] Filed: Apr. 17, 1991

[30] Foreign Application Priority Data

Apr. 24, 1990 [JP] Japan .................. 2-109659

[51] Int. Cl.$^5$ .............................. G11B 5/235
[52] U.S. Cl. .................... 360/120; 360/125
[58] Field of Search ........... 360/120, 122, 126, 125, 360/127

[56] References Cited

U.S. PATENT DOCUMENTS 3,810,245 5/1974 Ozawa et al. .
4,316,228 2/1982 Fujiwara .................. 360/127
4,604,670 8/1986 Visser ....................... 360/127

FOREIGN PATENT DOCUMENTS 2-98803 4/1990 Japan .

Primary Examiner—A. J. Heinz
Attorney, Agent, or Firm—Spencer, Frank & Schneider

[57] ABSTRACT

A magnetic head having a single crystal ferrite core, a magnetic gap formed in the ferrite core, a high saturation flux metal film disposed in close proximity to the magnetic gap, and a sliding surface. This sliding surface is formed on a surface of the ferrite core, and a recording medium slides thereon relative to the ferrite core in a sliding direction. The sliding surface is in the (110) plane, and the easy magnetization directions <100> of the (110) plane makes an angle equal to or greater than 20° with the sliding direction. With this arrangement, the wiggle phenomenon can be effectively prevented.

7 Claims, 7 Drawing Sheets

MAGNETIC HEAD

BACKGROUND OF THE INVENTION

1. Field of the Invention

The present invention relates to a magnetic head which is appropriate for recording to and reproducing from a high coercive force magnetic recording medium such as a so-called metal tape, and which has a high saturation flux density metal disposed near the magnetic gap of ferrite cores comprising part of the magnetic head.

2. Description of the Prior Art

Recently, in video tape recorders and digital tape recorders, techniques to achieve short wavelength recording and to increase track density have been remarkably developed so as to reduce tape sizes and to accomplish high quality image or audio recording. As a result, so-called metal tapes which have high coercive forces are becoming important.

To perform recording to or reproducing from such metal tapes, core materials of a high saturation flux density are required: conventional bulk-type Sendust heads are insufficient because not enough reproduction efficiency is too low owing to their eddy current losses. The latest technical progress in the field of magnetic heads, however, makes it possible to implement so called metal-in-gap heads which have magnetic films of a high saturation flux density metal such as Sendust disposed on the magnetic-gap-formed surfaces of ferrite cores of the magnetic heads. This enables the recording performance and reproduction efficiency to be maintained at a high level.

FIG. 1 is a perspective view showing an example of a conventional metal-in-gap head which comprises ferrite cores 1a and 1b made from a single crystal ferrite of Mn-Zn, Sendust films 2a and 2b made of films of a high saturation flux density metal to cover the magnetic-gap-formed surface, and a nonmagnetic glass 3 filled between the ferrite cores 1a and 1b to define a track width (i.e., gap length). Here, the single crystal ferrite is used as follows: (110) planes are used as a tape sliding surface 4 (i.e., surfaces 4a and 4b) and a side surface 5 (i.e., surfaces 5a and 5b); that is, the notation (110) as used in this specification corresponds to the notation {110} for planes of equivalent symmetry. See, for example, Semiconductor Devices, Physics and Technology, pages 6 and 7, S.M. Sze, John Wiley & Sons (1985). The easy magnetization directions <100> in the sliding surface 4, that is, in the plane (110) is directed in parallel with the side surface 5, namely, in the lengthwise direction of the track as shown in FIG. 1.

The conventional metal-in-gap head, however, has a problem that distortions appear in the reproduced signals when signals including low frequency components are reproduced, and hence noise in the frequency spectra increases. This is because, in the metal-in-gap head, the ferrite cores are subjected to a stress strain which is produced by the difference in the physical characteristics of ferrite cores and magnetic metal films.

An example of this will be described with reference to FIGS. 2A and 2B. FIG. 2A shows a normally recorded and reproduced waveform 11 of a sinusoidal signal of 750 kHz. The same head, however, produces, at a certain probability, a waveform 12 which includes a parasitic wave portion 13 at a shoulder part thereof as shown in FIG. 2B. FIG. 3 shows frequency spectra of the signals shown in FIGS. 2A and 2B. In FIG. 3, the x axis represents the frequency of the reproduced signals, and the y axis represents the amplitude of the signals. As shown in FIG. 3, noise of the abnormal waveform 12 increases over the entire frequency region. This phenomenon is called "a wiggle phenomenon". No wiggle phenomenon is observed with a signal without a low frequency component.

The wiggle phenomenon presents the following problems: it will increase the noise components in reproduced signals of, for instance, video signals including color signals, thus decreasing the S/N ratios of images; or it will increase the error rate of digital signals including their low frequency components.

SUMMARY OF THE INVENTION

Accordingly, it is an object of the present invention to provide a magnetic head, which is capable of carrying out good recording to and reproduction from a high coercive force magnetic recording medium, and which can restrict the wiggle phenomenon.

In the first aspect of the present invention, a magnetic head comprises:
 a single crystal ferrite core;
 a magnetic gap formed in the ferrite core; and
 a high saturation flux metal film disposed in close proximity to the magnetic gap;
 wherein the ferrite core has a sliding surface on which a recording medium relatively slides in a sliding direction, the sliding surface being in a (110) plane, and the easy magnetization directions <100> of the (110) plane making an angle equal to or greater than 20° with the sliding direction.

Here, the ferrite core may comprise first and a second core portions which are butted together via the magnetic gap.

The easy magnetization directions <100> of the sliding surface of the first portion and the easy magnetization directions <100> of the sliding surface. of the second portion of the ferrite core may extend in the same direction.

The easy magnetization directions <100> of the sliding surface of the first portion and the easy magnetization direction <100> of the sliding surface of the second portion of the ferrite core may extend in symmetric directions with regard to the magnetic gap.

The angle between the easy magnetization directions <100> and the sliding direction may be equal to or less than 80°.

In the second aspect of the present invention, a magnetic head comprises:
 a single crystal ferrite core;
 a magnetic gap formed in the ferrite core; and
 a high saturation flux metal film disposed in close proximity of the magnetic gap;
 wherein the ferrite core has a sliding surface on which a recording medium relatively slides and a side surface which is substantially perpendicular to the sliding surface, the sliding surface being in a (110) plane, and the easy magnetization directions <100> of the (110) plane making an angle equal to or greater than 20° with the side surface.

In the third aspect of the present invention, a magnetic head comprises:
 a single crystal ferrite core;
 a magnetic gap formed in the ferrite core;
 a high saturation flux metal film disposed in close proximity of the magnetic gap; and wherein the ferrite core has a sliding surface on which a recording medium relatively slides, the sliding surface being in a (110) plane, and the easy magnetization directions <100> of the (110) plane making an angle equal to or greater than 20° with a plane in which a magnetic circuit is formed.

The present invention prevents the wiggle phenomenon by increasing the angle which the easy magnetization directions <100> make with the side surfaces of the cores. By this, the wiggle phenomenon can be reduced without deteriorating the abrasion resistance of the magnetic head.

The above and other objects, effects, features and advantages of the present invention will become more apparent from the following description of the embodiments thereof taken in conjunction with the accompanying drawings.

DETAILED DESCRIPTION OF THE PREFERRED EMBODIMENTS

The invention will now be described with reference to the accompanying drawings.

The inventor of the present application has found, after intensive study for accomplishing the object of the present invention, that the problem described above can be improved by changing the crystal orientation of the single crystal ferrite.

Figure 1:
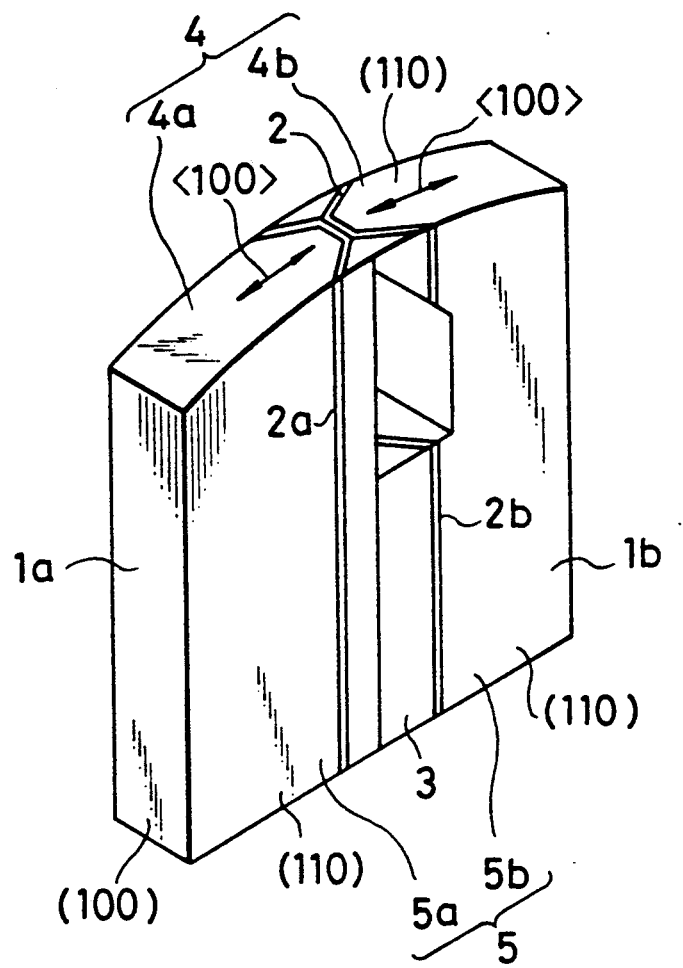
FIG. 1 is a perspective view showing an example of a conventional metal-in-gap magnetic head.
Figure 2A:
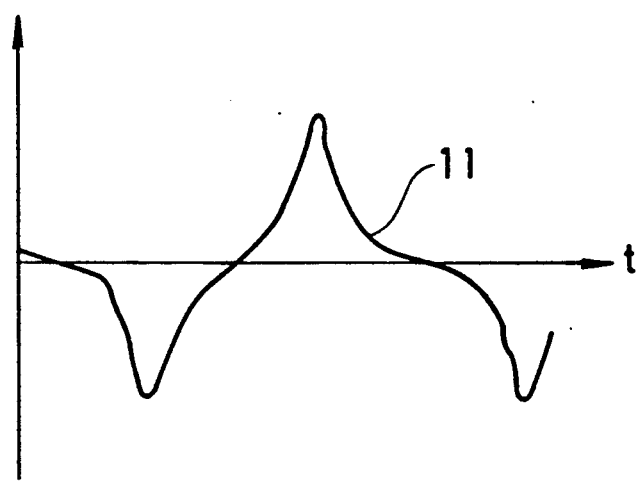
FIGS. 2A and 2B are waveform diagrams for explaining the wiggle phenomenon.
Figure 2B:
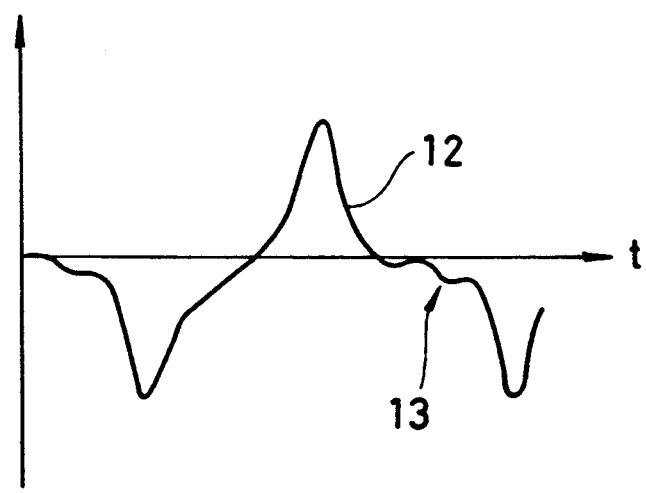
Figure 3:
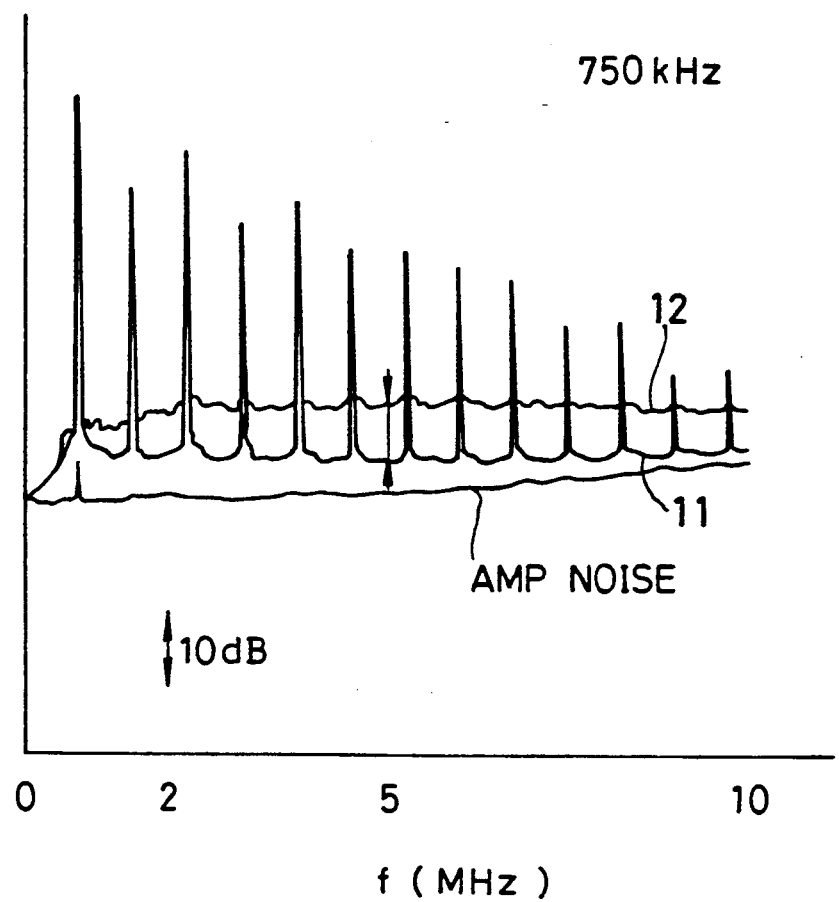
FIG. 3 is a diagram showing frequency spectra of the waveforms 11 and 12 shown in FIGS. 2A and 2B.

The easy magnetization directions in the sliding surface 4, that is, in the plane (110) of ferrite cores 1a and 1b of the conventional head is <100> as shown in FIG. 1. I have found that the probability of occurrences of the wiggle can be reduced by increasing the angle between the easy magnetization directions <100> and the side surface 5 of the magnetic head (i.e., the longitudinal direction of a track).

Figure 4:
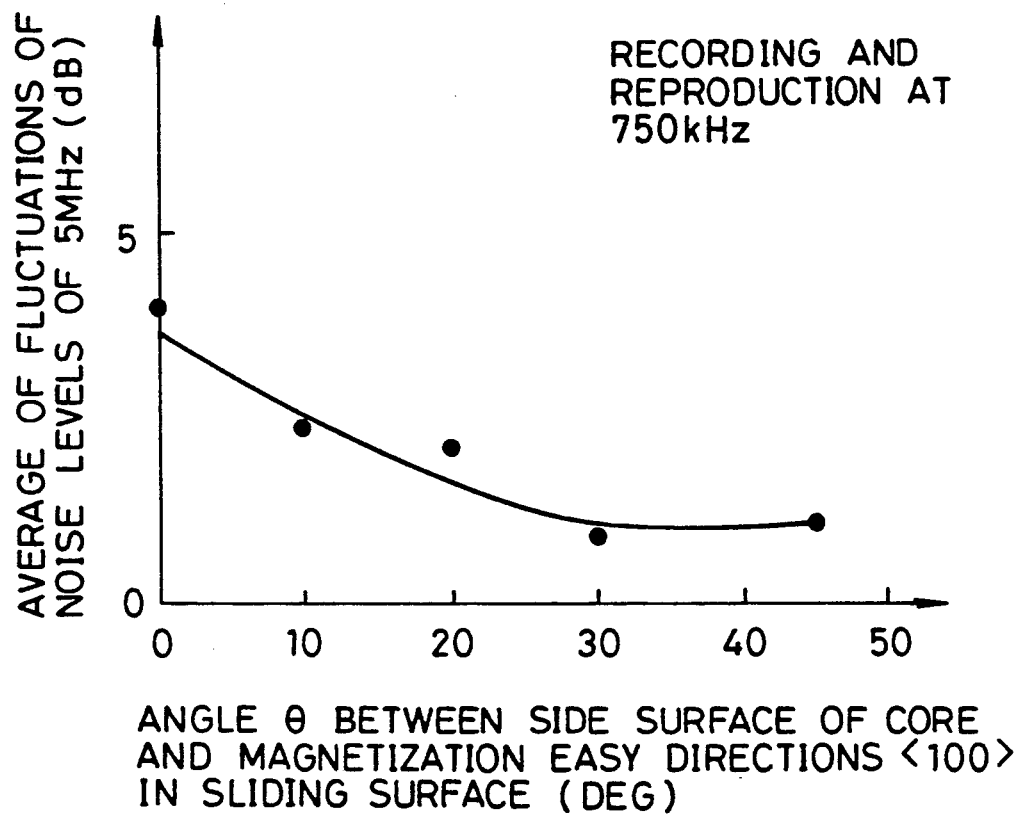
FIG. 4 is a diagram illustrating the relationship between the angle $\theta$ which the side surface 5 makes with the easy magnetization directions <100> and the average of fluctuations of noise levels.

FIG. 4 is a diagram illustrating the relationship between the angle $\theta$ which the side surface 5 consisting of surfaces 5a and 5b makes with the easy magnetization directions <100> (see FIG. 6) and the average of fluctuations of the noise levels. One of the characteristic phenomena which the wiggle phenomenon produces when a signal of 750 kHz, for example, is recorded and reproduced is that noise increase over the entire range of the frequency spectra. For this reason, the average of fluctuations of the noise levels is determined by measuring the fluctuation amounts of the noise levels a plurality of times at 5 MHz which is the lowest harmonic, and by calculating the average of the measured results. In FIG. 4, the x axis represents the angle $\theta$ between the easy magnetization directions <100> in the sliding surface 4 (the plane (110)) of the head and the side surface of the core, and the y axis represents the average of fluctuations of the noise levels. The averages of the fluctuations of the noise levels are calculated at angles $\theta = 0°$, 10°, 20°, 30° and 45°. It was found as shown in FIG. 4, that the fluctuation amount of the noise declines with an increase in the angle $\theta$. When the angle exceeds 20°, the averages of the fluctuations of the noise levels decrease to about 1 dB. Thus, in practice, the angle $\theta$ should be made 20° or more.

A reason for this is thought to be as follows: in ferrite cores, the reproduction of low frequency signals is mainly due to domain wall movement; the movement of domain walls is depressed owing to the effect of stresses from the surroundings such as the magnetic metal films 2a and 2b or from the glass 3; and this will present a harmful oscillation to the domain wall movement. To prevent this, the easy magnetization directions <100> must be inclined with regard to the side surface 5 of the core, which is parallel with a plane in which a magnetic circuit is formed, so that the domain wall movement can be reduced, and the magnetic rotations are effectively used. Incidentally, the embodiments of a magnetic head disclosed in this specification have side surfaces which are parallel with the longitudinal direction of a track along which the recording is performed.

Figure 5:
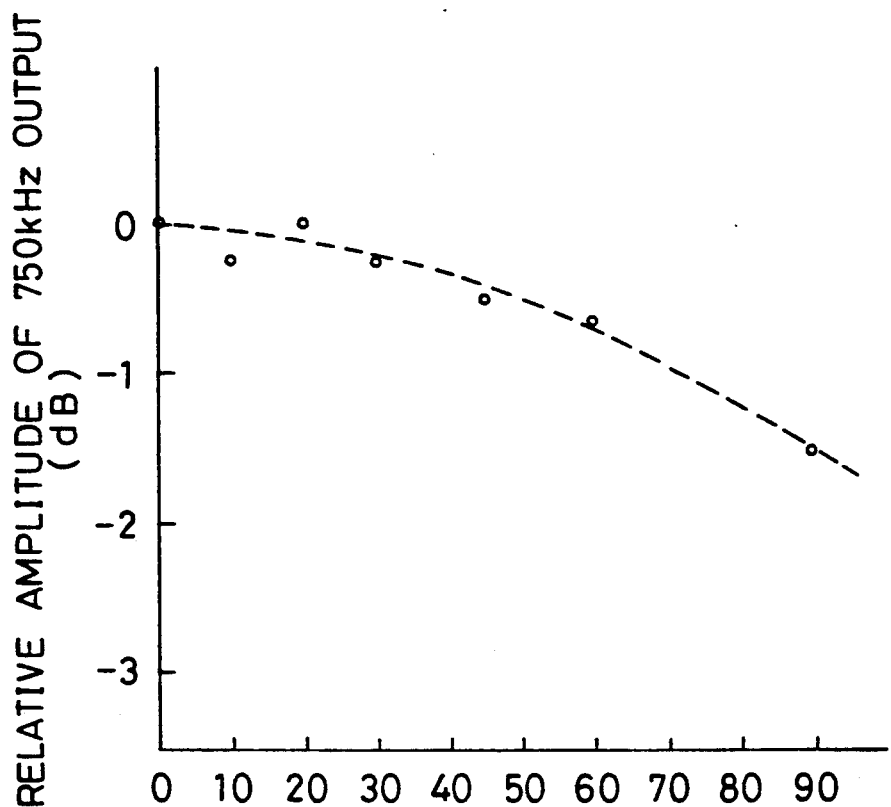
FIG. 5 is a diagram illustrating the relationship between the angle $\theta$ and the output amplitude of a recorded and reproduced signal of 750 kHz.

FIG. 5 is a diagram illustrating the relationship between the angle $\theta$ and the output amplitude of recorded and reproduced signals of 750 kHz. The output amplitude is represented in dB with regard to the output amplitude at $\theta = 0$. The inclination of the easy magnetization directions <100> with regard to the side surface of the core is assumed to decrease the permeability of the ferrite in the low frequency region because of the restriction of the domain wall movement. In practice, however, the output decline due to the angle change is small, and hence presents no problem as long as the angle does not approach 90°. Generally, the decline of output is less than 1.2 dB when the angle $\theta$ is less than 80 degrees, and so it poses little problem.

EMBODIMENT 1

Figure 6:
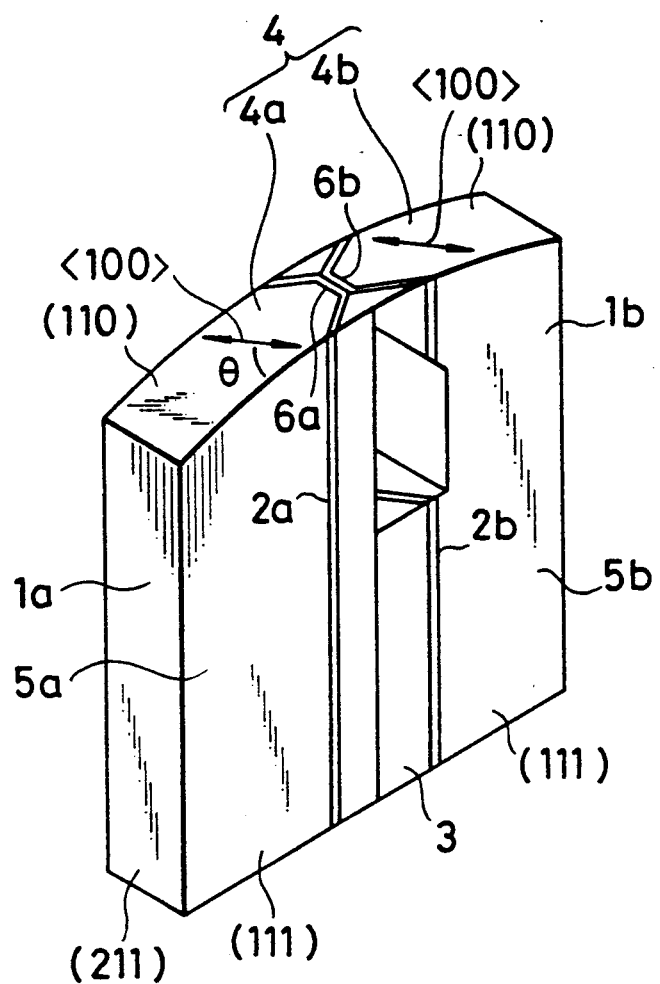
FIG. 6 is a perspective view showing the appearance of a magnetic head as a first embodiment of the present invention.
Figure 7:
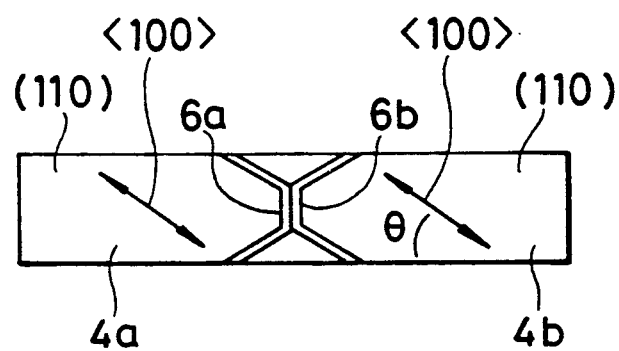
FIG. 7 is a plan view showing an arrangement of the recording medium sliding surface of the magnetic head of FIG. 6.

FIG. 6 is a perspective view showing the appearance of a magnetic head as a first embodiment of the present invention, and FIG. 7 is a plan view showing an arrangement of a recording medium sliding surface of the magnetic head of FIG. 6. The sliding surface 4 (i.e., surfaces 4a and 4b) of ferrite cores 1a and 1b is selected as (110) plane, the side surfaces 5a and 5b of the ferrite cores 1a and 1b are determined as the (111) plane, and the butt surfaces 6a and 6b of the ferrite cores 1a and 1b are specified as the (211) plane. The butt surfaces 6a and 6b of the ferrite cores 1a and 1b are covered with sendust films 2a and 2b, a high saturation flux density metal. The easy magnetization directions <100> in the sliding surface 4 or the plane (110) make an angle $\theta$ of 35.3° with the side surface 5 of the (111) plane.

Table 1 comparatively shows the characteristics of the magnetic head of the first embodiment and the conventional magnetic head as shown in FIG. 1: As is clear from Table 1, the average of fluctuations of the noise levels at 5 MHz in 750 kHz recording and reproduction is clearly improved as described before referring to the measurement results shown in FIG. 4. Thus, the magnetic head of the present invention has better S/N ratios than the conventional head. In addition, the output level of the magnetic head of the first embodiment is approximately equal to that of the conventional one as shown in Table 1, and the abrasion resistance of the head of the present invention is the same as that of the conventional head.

TABLE 1

|  | θ | Output (3.8 m/s) 750 kHz | Output (3.8 m/s) 5 MHz | abrasion resistance (1000 h) | 5 MHz average of fluctuations of noise levels |
|---|---|---|---|---|---|
| a head of prior art | 0 | 0 dB | 0 dB | −3 μm | 3.7 dB |
| a head of embodiment 1 | 35.7° | −0.2 dB | +0.1 dB | −3 μm | 0.8 dB |

In Table 1, the output amplitudes are represented in dB with respect to the conventional value defined as 0 dB. In short, the output of the magnetic head of the present invention little decreases with the alteration of the crystal orientation of the single crystal ferrite because the angle θ is less than 80°, and in addition, the abrasion resistance of the sliding surface is not degraded because the crystal orientation of the sliding surface is not changed.

EMBODIMENT 2

Figure 8:
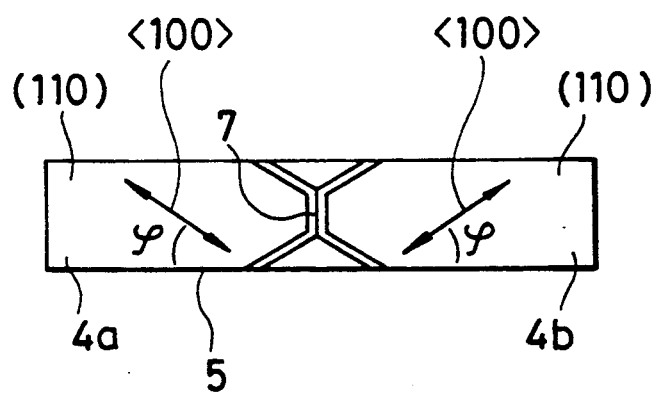
FIG. 8 is a plan view showing an arrangement of a recording medium sliding surface of a magnetic head of a second embodiment of the present invention.

FIG. 8 is a plan view showing the arrangement of the recording medium sliding surface of a magnetic head of a second embodiment of the present invention. This magnetic head differs from that of FIGS. 6 and 7 in that the easy magnetization directions <100> of the sliding surfaces 4a and 4b of ferrite cores 1a and 1b of this embodiment extend in symmetrical directions with respect to the gap 7 as shown in FIG. 8, and make an angle φ with the side surface of the core, respectively, φ being 20°-50°, whereas the easy magnetization directions <100> of the sliding surfaces 4a, 4b of the magnetic head shown in FIGS. 6 and 7 extend in the same direction.

With the magnetic head shown in FIG. 8, it was confirmed that the wiggle phenomenon was improved without deteriorating the output characteristics and the abrasion resistance, as in the magnetic head shown in FIGS. 6 and 7.

Although specific embodiments of a magnetic head constructed in accordance with the present invention have been disclosed, it is not intended that the invention be restricted to either the specific configurations or the uses disclosed herein. Modifications may be made in a manner obvious to those skilled in the art. For example, although in the embodiments above, the angle θ between the side surface of the ferrite cores and the easy magnetization directions <100> is specified between 20°-80° to satisfy the requirement to maintain the output level change within a slightest range of less than −1 dB, the angle θ can be set at above 80°, if an output decline within −2 dB is permitted. Accordingly, it is intended that the invention be limited only by the scope of the appended claims.

What is claimed is:

1. A magnetic head comprising:
   a single crystal ferrite core;
   a magnetic gap formed in said ferrite core; and
   a high saturation flux metal film disposed in close proximity to said magnetic gap;
   wherein said ferrite core has a sliding surface on which a recording medium slides relative to the ferrite core in a sliding direction, said sliding surface being in a (110) plane, and the easy magnetization directions <100> of said (110) plane makes an angle equal to or greater than 20° with the sliding direction.

2. A magnetic head as claimed in claim 1, wherein said ferrite core comprises first and second core portions, said core portions being butted together via said magnetic gap.

3. A magnetic head as claimed in claim 2, wherein the easy magnetization directions <100> of the sliding surface of said first portion and the easy magnetization direction <100> of the second portion of said ferrite core extend in the same direction.

4. A magnetic head as claimed in claim 2, wherein the easy magnetization directions <100> of the sliding surface of said first portion and the easy magnetization directions <100> of the sliding surface of said second portion of said ferrite core extend in symmetric directions with respect to said magnetic gap.

5. A magnetic head as claimed in claim 1, wherein the angle between the easy magnetization directions <100> and the sliding direction is equal to or less than 80°.

6. A magnetic head comprising:
   a single crystal ferrite core;
   a magnetic gap formed in said ferrite core; and
   a high saturation flux metal film disposed in close proximity to said magnetic gap;
   wherein said ferrite core has a sliding surface on which a recording medium slides relative to the ferrite core and a side surface which is substantially perpendicular to said sliding surface, said sliding surface being in a (110) plane, and the easy magnetization directions <100> of said (110) plane makes an angle equal to or greater than 20° with the side surface.

7. A magnetic head comprising:
   a single crystal ferrite core;
   a magnetic gap formed in said ferrite core; and
   a high saturation flux metal film disposed in close proximity to said magnetic gap;
   wherein said ferrite core has a sliding surface on which a recording medium slides relative to said ferrite core, said sliding surface being in a (110) plane, and the easy magnetization directions <100> of said (110) plane making an angle equal to or greater than 20° with a plane in which a magnetic circuit is formed.

* * * * *